United States Patent [19]
Balan

[11] 3,823,925
[45] July 16, 1974

[54] PRISMATIC COOLING-ELEMENT ASSEMBLY FOR WATER-COOLING TOWERS

[75] Inventor: Niculae Cornel Balan, Cluj, Romania

[73] Assignee: Trustul de Constructii Industriale Cluj, Cluj, Romania

[22] Filed: Mar. 1, 1972

[21] Appl. No.: 230,555

[30] Foreign Application Priority Data
Mar. 12, 1971 Romania .............................. 66237

[52] U.S. Cl. ............................ 261/98, 261/DIG. 11
[51] Int. Cl. .............................................. B01f 3/04
[58] Field of Search ............ 261/112, DIG. 11, 103, 261/98, 94

[56] References Cited
UNITED STATES PATENTS

| 803,925 | 11/1905 | Ohde | 261/103 |
|---|---|---|---|
| 2,490,079 | 12/1949 | Melvill | 261/94 |
| 2,490,080 | 12/1949 | Melvill | 261/DIG. 11 |
| 2,634,959 | 4/1953 | Cave | 261/DIG. 11 |
| 2,977,103 | 3/1961 | Smith et al. | 261/112 |
| 3,235,234 | 2/1966 | Beaudoin | 261/112 |
| 3,346,246 | 10/1967 | Loetel et al. | 261/112 |
| 3,466,019 | 9/1969 | Priestley | 261/112 |
| 3,493,219 | 2/1970 | Stachowiak et al. | 261/DIG. 11 |

Primary Examiner—Tim R. Miles
Attorney, Agent, or Firm—Karl F. Ross; Herbert Dubno

[57] ABSTRACT

A cooling-element assembly for a water-cooling tower in which water droplets are dispersed over the entire length of the tower for contact with air passing between and through the elements. The assembly comprises a prismatic array of mutually parallel equispaced polyhedral nets of galvanized iron or synthetic-resin fiber held at their tops and bottoms by horizontally extending pairs of galvanized iron ropes to maintain an inclination of each net to the vertical.

3 Claims, 3 Drawing Figures

FIG. 1
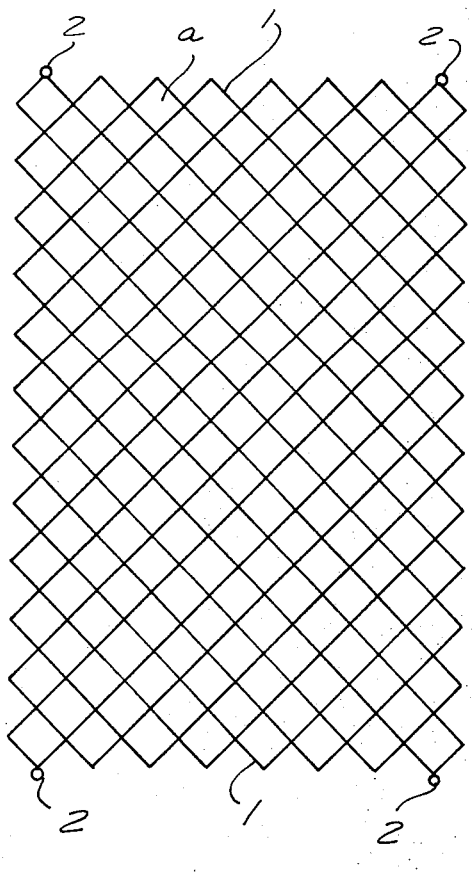
FIG. 2
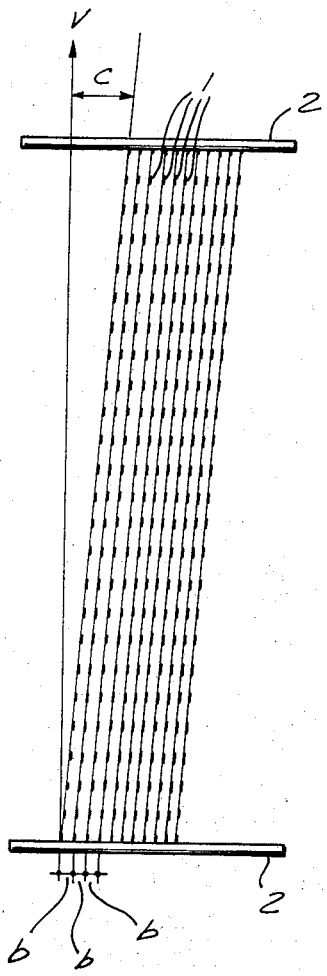
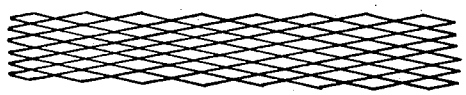
FIG. 3

PRISMATIC COOLING-ELEMENT ASSEMBLY FOR WATER-COOLING TOWERS

The present invention relates to hollow-block cooling-element assemblies used for the construction of water-cooling towers.

Conventional cooling-tower hollow-block assemblies may comprise flat or corrugated asbestos-cement plates mounted vertically or in a honeycomb construction so as to form vertical channels through which the warm water flows in a film, in jets and in drops.

In another conventional system, the elements consist of corrugated and perforated plastic foils disposed vertically adjacent one another so that the space between the foils constitutes air passages and the water flow is countercurrent to the air flow.

These cooling-element assemblies have the disadvantage that efficient heat exchange is limited by the available contact surface while the duration of contact between water and cooling air is relatively small.

It is, therefore, an object of the present invention to provide a cooling-element assembly for a water cooling tower in which the aforementioned disadvantages are obviated.

The cooling-element assembly or hollow block for a water-cooling tower according to the invention eliminates the aforementioned drawbacks by providing polyhedral cooling elements in the form of mesh nets or galvanized steel wire, synthetic-resin yarn or like material inclined to the vertical and held in position, i.e., obliquely but parallel and in spaced relation to one another by galvanized steel rope extending horizontally. The equispaced net, in projection in a horizontal plane providing a dense network of strands which intercept the descending water jets or droplets and breaks them up into such form as will increase the duration of contact between the water and the air.

The above and other objects, features and advantages of the present invention will become more readily apparent from the following description, references being made to the accompanying drawing in which:

FIG. 1 is a front view of a cooling-assembly for a water-cooling tower according to the invention;

FIG. 2 is a vertical section through the assembly; and

FIG. 3 is a top view of the assembly.

The cooling-element assembly according to the present invention comprises a multiple of nets 1 of rectangular configuration (see FIG. 1) having polyhedral mesh openings $a$ defined by strands which, in the plan of the net are not diagrammed or at an inclination to the vertical. At the tops and the bottoms, the nets 1 are held in equispaced relationship, i.e., with a spacing $b$ substantially smaller than the maximum deviation $c$ from the vertical $v$ (FIG. 2), by galvanized wire ropes engaging the nets 1 at their upper and lower edges in pairs (FIG. 1), the wire ropes running horizontally (FIG. 2). As a consequence, a projection of the assembly onto a horizontal plane (FIG. 3) shows a very dense network resulting from interposition of the various nets 1. The water jets streaming through the assembly heat the nets 1 and are split up into a multitude of fine drops the total surface area of which is much larger than that of the initial water drops, thereby promoting heat exchange between the warm water and the cooling air.

The nets 1 are made out of thin galvanized steel wire, synthetic-resin yarn or yarn of other material and the mesh configuration may be triangular, square, rhomboid, hexagonal or other polyhedral shapes. The ropes 2 carrying the nets 1 are fixed on a support structure of the cooling tower (not shown).

I claim:

1. A cooling-element assembly for a water-cooling tower comprising a prismatic array of generally planar nets of identical inclination, said nets being inclined to the vertical and being closely spaced apart by a distance smaller than the maximum deviation of the nets from the vertical, and upper and lower pairs of horizontal galvanized steel wire ropes directly engaging said nets for supporting and positioning same.

2. The assembly defined in claim 1 wherein said nets are composed of galvanized steel wire.

3. The assembly defined in claim 1 wherein said nets are composed of synthetic-resin fibers.

* * * * *